United States Patent [19]

Kumagai et al.

[11] Patent Number: 5,684,897
[45] Date of Patent: Nov. 4, 1997

[54] METHOD FOR QUANTIZING COLOR IMAGE DATA BY MINIMIZING LEAST SQUARES ERROR OF BINARY CODING

[75] Inventors: Ryohei Kumagai; Zi Quan Hong, both of Tokyo, Japan

[73] Assignee: EZEL Inc., Tokyo, Japan

[21] Appl. No.: 511,291

[22] Filed: Aug. 4, 1995

Related U.S. Application Data

[63] Continuation-in-part of Ser. No. 15,123, Feb. 9, 1993, abandoned.

[30] Foreign Application Priority Data

Feb. 19, 1992 [JP] Japan .................................... 4-69510

[51] Int. Cl.$^6$ .............................. G06K 9/46; G09G 5/06
[52] U.S. Cl. .......................... 382/253; 382/162; 382/166; 345/199; 345/155
[58] Field of Search ........................ 382/166, 164, 382/162, 167, 253, 232; 345/199, 155, 150, 153, 202; 358/518, 500, 448, 453

[56] References Cited

U.S. PATENT DOCUMENTS

| | | | |
|---|---|---|---|
| 4,907,075 | 3/1990 | Braudaway | 358/522 |
| 5,047,842 | 9/1991 | Bouman, Jr. et al. | 358/515 |
| 5,049,986 | 9/1991 | Auno et al. | 358/522 |
| 5,222,154 | 6/1993 | Graham et al. | 382/162 |

FOREIGN PATENT DOCUMENTS

| | | | |
|---|---|---|---|
| 5242234 | 9/1993 | Japan | G06F 15/66 |

OTHER PUBLICATIONS

A. Rosenfeld et al., Digital Picture Processing, Academic Press Inc., Second Edition, vol. 2, (1982), pp. 116–160.

Fujimori et al., NAPLPS Videotex Frame Creation System with Automatic Encoding of Input Images, IEEE Transactions on Consumer Electronics, vol. 31, No. 3, Aug. 1985, pp. 290–298.

Patent Abstracts of Japan, vol. 14, No. 434, Sep. 18, 1990 JPA-2170192.

IBM Technical Disclosure Bulletin, vol. 32, No. 313, Aug. 1989, pp. 384–387.

Patent Abstracts of Japan, vol. 13, No. 496, Nov. 9, 1989 JPA-1198866.

Heckbert, "Color Image Quantization for Frame Buffer Display", Computer Graphics, vol. 16, No. 3, pp. 297–307 (Jul. 1982).

*Primary Examiner*—Leo Boudreau
*Assistant Examiner*—Wenpeng Chen
*Attorney, Agent, or Firm*—Cushman, Darby & Cushman IP Group of Pillsbury Madison & Sutro LLP

[57] ABSTRACT

A method of condensing color image data in an image processing system so as to simplify operations while reducing errors in the condensation.

The method includes, by computer, generating electrical signals corresponding to color image data representative of a physical image; associating an electrical signal corresponding to a representative code with portions of the signals representative of data in the color image data corresponding to each of the pixels; grouping together electrical signals representative of pixels having identical representative codes to form at least one group; assigning to the representative code for each of the at least one group a condensed pixel representable by the representative code for that group; and setting an electrical signal portion corresponding to each pixel in that group equal to an electrical signal representative of a pixel corresponding to the condensed pixel.

3 Claims, 5 Drawing Sheets

METHOD FOR QUANTIZING COLOR IMAGE DATA BY MINIMIZING LEAST SQUARES ERROR OF BINARY CODING

This application is a continuation-in-part of U.S. patent application Ser. No. 08/015,123 Feb. 9, 1993, now abandoned, which is hereby incorporated herein by reference.

FIELD OF THE INVENTION

This invention relates to processing and condensing data in an image processing system, and, more particularly, to a method and apparatus for condensing color image data for subsequent recognition of an image from the data.

BACKGROUND OF THE INVENTION

In image processing, when condensing color image data, it is often necessary to quantize the color of each pixel in an image into a predetermined smaller number of colors. In this case, similar colors are identified beforehand and distributed into the most similar color of the predetermined smaller number of colors. However, the criteria for measuring the similarity of two colors (or the distance between two colors) is not fixed. That is, the distance between two colors can be defined by different similarity measures. These measures include Euclidean and Hamming distances between colors. There are, however, tradeoffs between different similarity measures. For instance, when the distance between two colors is defined by their Euclidean distance, the number of operations required to determine their similarity becomes large. On the other hand, when the distance between two colors is defined by their Hamming distance, the error is larger than that generated when using the Euclidian distance criteria.

SUMMARY OF THE INVENTION

This invention solves the above-mentioned prior art problems in image processing systems, and provides a method for condensing color image data in such systems so as to simplify processing operations by controlling errors resulting from data condensation.

A method of condensing data in this invention converts color in a code containing only the higher-order bits of the color components in red-green-blue (RGB) space into the maximum number of pixels in the code.

According to the method of condensing data according to this invention, the calculation is easy and has few errors because the necessary processing requires division of color groups according to the higher bit data and calculations for maximum values in the group.

In preferred embodiments, this invention is a method, in a computer-based image processing system, for processing signals representative of color image data. The signals represent physical images and comprise a plurality of pixels. The method includes, by computer, generating electrical signals corresponding to color image data representative of the physical image, the electrical signals representing, for each of the pixels, values of each of three primary colors for the pixel, each of the values having upper bits and lower bits of predetermined lengths; defining as color data the upper bits of the signals; defining representative color codes for the image, the codes consisting of the color data sequentially concatenated; grouping together the electrical signals representative of the pixels in the plurality of pixels having identical representative color codes to form at least one color group; determining a representative code having a red component, a green component and a blue component for each the at least one group. The representative code is determined using a least-squares technique based on the number of pixels of each color in each color group.

In another aspect, the invention further includes, after a representative code has been determined for a group, determining whether a color corresponding to that representative code is present in said that group. When that color is determined not to be present in said that group, a color of maximal number of pixels in that group is found and the color code of that color is substituted for the representative color code for that group.

In preferred embodiments, the value of each primary color for each of the pixel values is represented by an eight-bit binary number, or which seven bits comprise the upper bits and one bit comprises a lower bit.

Other objects, features, and characteristics of the present invention as well as the methods of operation and functions of the related elements of structure, and the combination of parts and economies of manufacture, will become more apparent upon consideration of the following description and appended claims with reference to the accompanying drawings, all of which form a part of this specification.

DETAILED DESCRIPTION OF THE PRESENTLY PREFERRED EMBODIMENT

Hereinafter, an embodiment of a method for condensing color image data according to this invention is explained with reference to the attached drawings.

Figure 1:
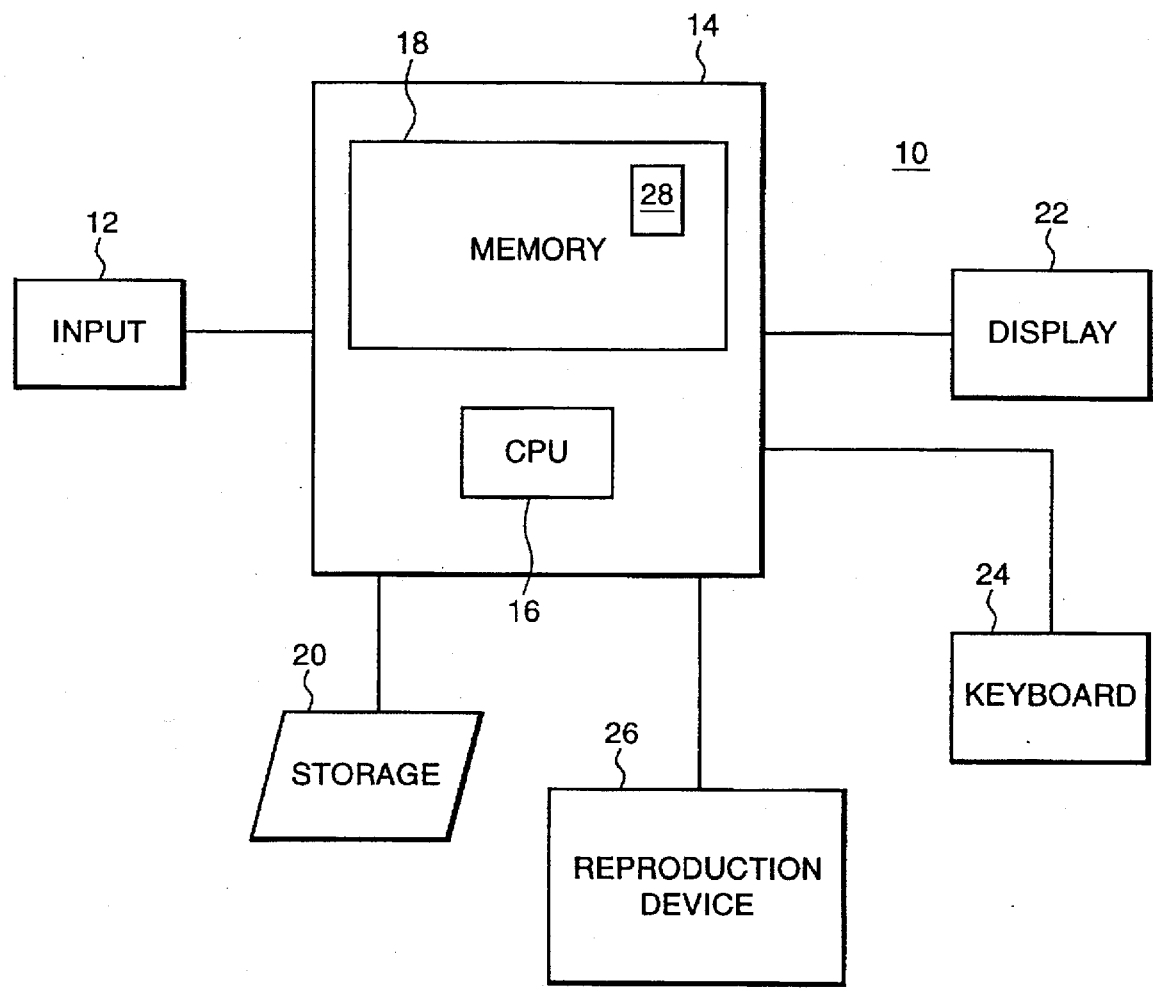
FIG. 1 depicts a typical image processing system of the present invention.

With reference to FIG. 1, an image processing system 10 includes input means 12 which obtains color image data representative of physical images and which produces electrical signals representative of pixel values of the color image data. The input means 12 is connected to a computer 14 which includes at least one processing unit CPU 16, internal memory (for example, RAM) 18, external memory (for example, disk 20), a display 22, a reproduction device 26 for producing output color images, and various other input devices such as a keyboard 24 and the like.

Input means 12 can be a video camera, a flatbed scanner or the like. The reproduction device 26 can be a color laser printer, an inkjet printer or the like. The image processing system 10 can also include special purpose high-speed processors and memories (not shown) to improve its performance for specific image processing types of tasks.

Control of the various processes or functions of image processor 10 rests in part on specialized computer programs residing in memory 28 (or 20) and executing on processor 16. If a particular program or process is not resident in the memory 28 when required, it is obtained from the external storage 20 and put in the memory 28 in a manner which is well known.

As noted above, input means 12 obtains color image data representative of physical images and produces electrical signals made up of a plurality of pixels and representative of the color image data. Various possible representations for pixels exist. In RGB (red, green, blue) color space, a particular pixel is represented by three parameters or components, an Red component (R), a Green component (G), and a Blue component (B). The R, G and B parameters may be binary-encoded, where the parameters are divided into lower n bits Rl, Gl, Bl and higher (or upper) m bits Ru, Gu, Bu.

In other words, in RGB space, each pixel may be represented by three binary-encoded parameters or components, R, G and B. Different values for these components give different colors to a pixel. Further, each component, when binary-encoded, has its value represented by a series of zeros and ones (a bit string). A binary representation of a number has low-order bits and high-order bits. For example, the k-bit binary number $B=b_0 b_1 \ldots b_p \ldots b_k$ can be considered (arbitrarily) as having low order bits, $b_0 b_1 \ldots b_{p-1}$, and high-order bits, $b_p \ldots b_k$. The decision as to which bits are low order and which are high order (that is, the value of p above) is application and implementation dependent. In the present embodiment, as stated above, n bits are used as the low order (lower) bits. For simplicity, denote the high-order (upper) bits of a binary number B as Bu, and denote the low-order (lower) bits of B as Bl.

Thus, the R, G, and B values of a particular pixel may be represented as:

$R = Ru \times 2^n + Rl;$ $G = Gu \times 2^n + Gl;$ and $B = Bu \times 2^n + Bl.$ The R, G and B values of the pixel may be designated, for example, as follows (although other logical groupings are also possible):

| component | R | | G | | B | |
|---|---|---|---|---|---|---|
| | Rl | Ru | Gl | Gu | Bl | Bu |
| size in bits | n | m | n | m | n | m |

A representative code C is defined according to the higher-order bits Ru, Gu, and Bu in this system, and colors may be classified into groups, according to this representative code. If the number of bits in each of the components Ru, Gu, and Bu is m, then data connecting Ru, Gu, and Bu serially in a predetermined order may be generated as a representative code:

$C = Ru \times 2^{2m} + Gu \times 2^m + Bu.$

If the number of representative codes C that are available is $2^{3m}$, then the k-th representative code is $C_k$.

In other words, since each of Ru, Gu, and Bu is an m-bit value, the representative code C, as defined above, is a 3m-bit value. Therefore, there are $2^{3m}$ possible values that C can assume, namely 0 to $2^{3m}-1$. Denote the k-th of these values, that is, the k-th representative code, as $C_k$.

Thus, each pixel is represented by three binary-encoded values, R, G, and B. The high-order m bits of each pixel encode a representative code for that pixel, that is, the color group to which that pixel belongs. The remaining low-order bits determine which color within that group the pixel has. If the number of bits in the lower-order bits of each of Rl, Gl, and Bl is n, then a particular representative code $C_k$ may represent $2^{3n}$ colors. Denote the i-th of these colors in group $C_k$ as $C_{k,i}$, i ranging from 0 to $2^{3n}-1$.

Here, a color can be designated as follows:

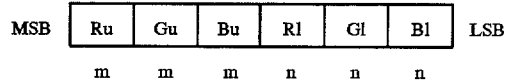

where Rl, Gl and Bl are representative of $Rl_i$, $Gl_i$ and $Bl_i$ over the entire image.

This can also be viewed as:

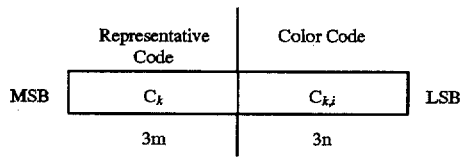

The representative code $C_k$ and a color code $C_{k,i}$ within a group represented by $C_k$ are defined, respectively, as follows:

$C_k = 2^{2m} Ru + 2^m Gu + Bu$ $C_{k,i} = 2^{3n} C_k + 2^n Rl_i + 2 Gl_i + Bl_i$ (i=1, ..., $2^{3n}$)

Therefore, color codes belonging to a group $C_k$ can be defined as follows:

$\{C_{k,1}, C_{k,2}, \ldots, C_{k,2^{3n}}\}$

The various colors that may be designated by a representative code differ only in the lower n bits; thus, the maximum color distance (the Hamming Distance) between any two colors in the same color group is $3 \times 2^{n-1}$. The classification according to a representative code $C_k$ involves colors of similar short color distance. Classification of groups is therefore appropriate.

In some preferred embodiments, each pixel is represented by three eight-bit binary values. That is, each of the red, green and blue values is represented by an eight (8) bit binary value. Preferred values for m and n are m=7 and n=1. In other words, each representative code $C_k$ for each group k is made up by concatenating the seven high-order bits of the red, green and blue pixel values, and the color codes for each group, $C_{k,i}$, are made up by concatenating the remaining one low-order bit of each of the red, green and blue pixel values. In this case there are $2^{21}$ possible representative codes and there are $2^3=8$ possible colors for each of these codes.

For the case where each pixel is represented by three eight-bit values, m=7 and n=1, a color can be designated as follows:

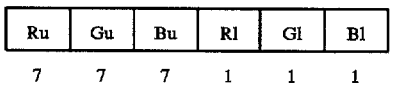

where Rl, Gl and Bl are representative of $Rl_i$, $Gl_i$ and $Bl_i$ over the entire image.

This can also be viewed as:

| Representative Code | Color Code |
|---|---|
| $C_k$ | $C_{k,i}$ |
| 21 | 3 |

Other values of m and n are acceptable and can be chosen depending on the intended application.

Suppose each color and the number of pixels in the representative code $C_k$ are as follows:

color: $C_{k,i}$ number of pixels: $P(C_{k,i})$ where i=1 to $2^{3n}$ and k,i is the index of the i-th actual color in the k-th color group, then the representative color $C_{rep,k}$ providing the minimum square error of the color is obtained as follows, where $C_{rep,k}$ has three components, a red component $R_{rep,k}$, a green component $G_{rep,k}$, and a blue component $B_{rep,k}$:

A summation $\epsilon^2$ of squared Euclidian color distance, a square error of color, in the k-th color group is calculated as below.

$$\epsilon^2 = \sum_{R_{k,i}} \sum_{G_{k,i}} \sum_{B_{k,i}} \{(R_{rep,k} - R_{k,i})^2 + (G_{rep,k} - G_{k,i})^2 + (B_{rep,k} - B_{k,i})^2\} P(C_{k,i}) \quad (1)$$

where $R_{rep,k}$ is the Red component of $C_{rep,k}$;
$G_{rep,k}$ is the Green component of $C_{rep,k}$;
$B_{rep,k}$ is the Blue component of $C_{rep,k}$;
$R_{k,i}$ is the Red component of $C_{k,i}$;
$G_{k,i}$ is the Green component of $C_{k,i}$; and
$B_{k,i}$ is the Blue component of $C_{k,i}$.

Here, it is assumed that $\epsilon^2$ is minimum when all of the partial differentials with respect to $R_{k,i}$, $G_{k,i}$, $B_{k,i}$ are equal to zero, that is, when $$\frac{\partial \epsilon^2}{\partial R_{k,i}} = \sum_{R_{k,i}} 2(R_{rep,k} - R_{k,i}) \sum_{G_{k,i}} \sum_{B_{k,i}} P(C_{k,i}) = 0 \quad (2)$$

$$\frac{\partial \epsilon^2}{\partial G_{k,i}} = \sum_{G_{k,i}} 2(G_{rep,k} - G_{k,i}) \sum_{B_{k,i}} \sum_{R_{k,i}} P(C_{k,i}) = 0 \quad (3)$$

$$\frac{\partial \epsilon^2}{\partial B_{k,i}} = \sum_{B_{k,i}} 2(B_{rep,k} - B_{k,i}) \sum_{R_{k,i}} \sum_{G_{k,i}} P(C_{k,i}) = 0 \quad (4)$$

Then the values of $R_{rep,k}$, $G_{rep,k}$, and $B_{rep,k}$, together defining the color $C_{rep,k}$ representative of the k-th color group, are obtained from the following three formulas:

$$R_{rep,k} = \frac{\sum_{R_{k,i}} R_{k,i} \sum_{G_{k,i}} \sum_{B_{k,i}} P(C_{k,i})}{\sum_{G_{k,i}} \sum_{B_{k,i}} P(C_{k,i})} \quad (5)$$

$$G_{rep,k} = \frac{\sum_{G_{k,i}} G_{k,i} \sum_{B_{k,i}} \sum_{R_{k,i}} P(C_{k,i})}{\sum_{B_{k,i}} \sum_{R_{k,i}} P(C_{k,i})} \quad (6)$$

$$B_{rep,k} = \frac{\sum_{B_{k,i}} B_{k,i} \sum_{R_{k,i}} \sum_{G_{k,i}} P(C_{k,i})}{\sum_{R_{k,i}} \sum_{G_{k,i}} P(C_{k,i})} \quad (7)$$

A color $C_{rep,k}$ is defined by the three components ($R_{rep,k}$, $G_{rep,k}$, $B_{rep,k}$), however, it is possible that this color is not actually present in the original image. In this case, all colors in the k-th group are converted into a new color $C'_{rep,k}$.

To simplify the calculation, it is assumed as below that $$C_{rep,k} = C_{k,i}$$
$$\text{where } P(C_{k,i}) = max\{P(C_{k,i})\}$$
$$= \text{maximum number of pixels of color } C_{k,i}$$
$$= P_{max,k}.$$

By approximating $C_{rep,k}$ in this way, the calculation is simplified and the error is very small. The error $\epsilon$ is the largest when all of the colors $C_{k,i}$ (from i=1 to i=$2^{3n}$) are evenly distributed in an image. This error is expressed by the formula below.

$$\epsilon \leq \frac{\left(\sum_{1}^{2^{3n}} - 1\right)}{2^{3n}} = 2^{3n-1} - 0.5 \quad (8)$$

Evaluating the color-by-color error and calculating the error ($\epsilon$) of color distance (d), that is, the color distance between the selected colors and the actual data point colors, the following formula holds:

$$\epsilon_d \leq 3 \times (2^n - 1)$$

Color image data can be condensed or quantized and calculated easily to a good approximation.

The above-described processing is carried out in an image processing system 10 (as shown in FIG. 1) based on instructions for controlling computer 14, the instructions being stored in a program on disk 20 and/or in memory 18. These instructions take the form of a typical computer program and may be represented in executable form (for example, in object code) on the disk 20 and/or in memory 18. Different versions of the executable form would exist for different processing units (different CPUs), however, whatever form these instructions take, they instruct the appropriate parts of image processing system 10 to perform the required processing.

Figure 2:
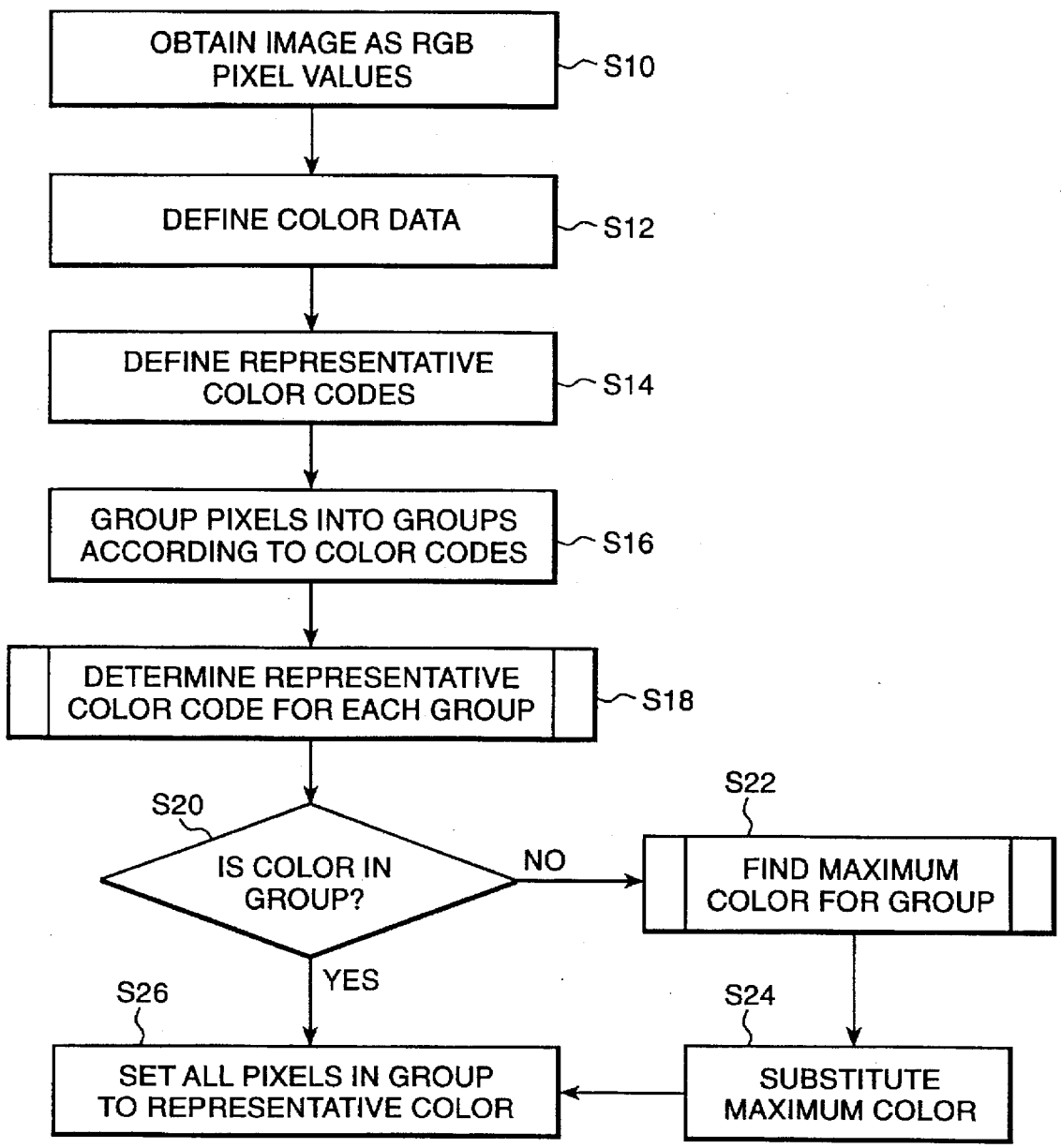
FIGS. 2-4 are flow-charts showing an embodiment of this invention.
Figure 3:
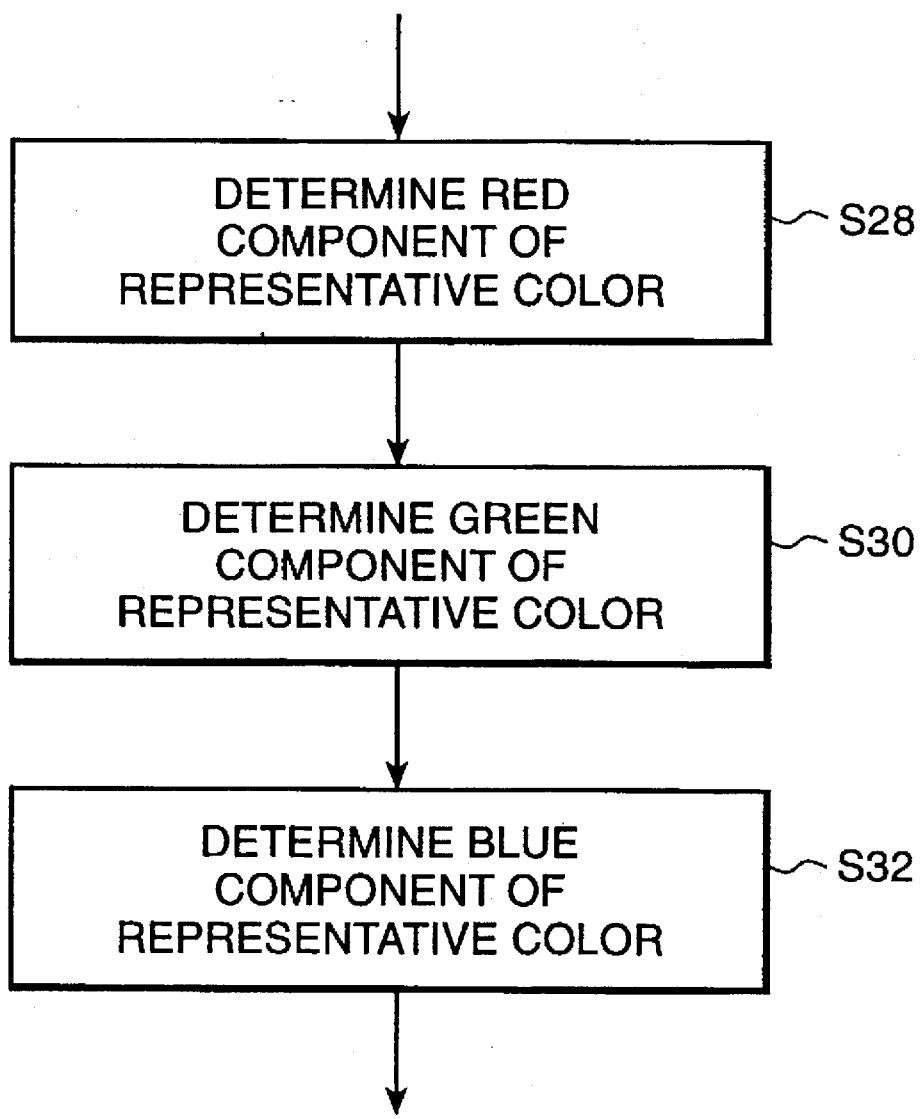
Figure 4:
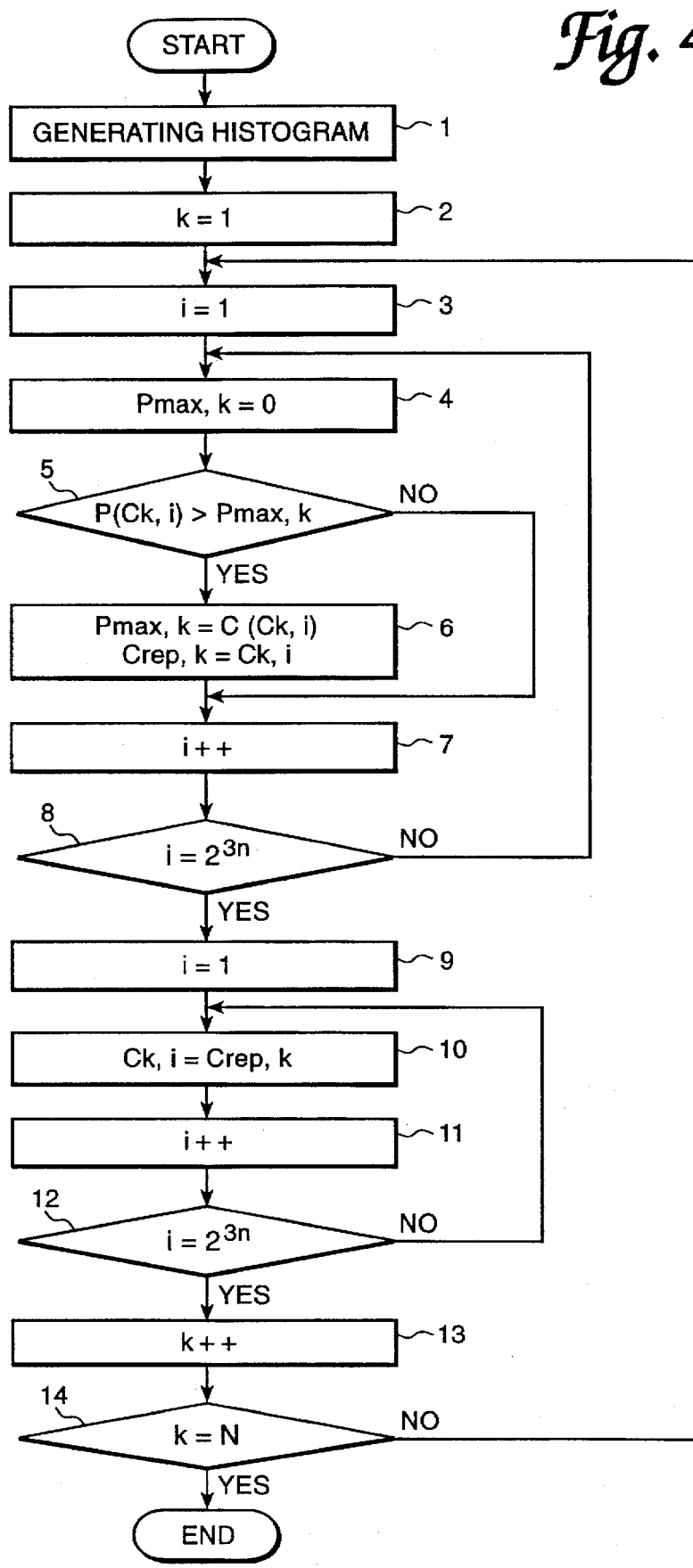

FIGS. 2–4 are flow-charts showing the above-described processing as performed on the processing unit 16 of image processor 10. With reference to FIG. 2, given an input image obtained (Step S10) by input means 12, the color data and representative color codes are determined (steps S12 and S14). Then the pixels are grouped according to the color codes (Step S16) and the representative color code for each color group is determined (Step S18). The process of determining the representative color for a group (step S18) is shown in FIG. 3 wherein each of the red, green and blue color components is determined (steps S28, S30, S32). Then, for each group, determine whether there is a color present corresponding to the determined representative color (Step S20). If no such color is present in the group, then find the maximum color for the group (Step S22) and substitute that found maximum color for the representative color for that group (Step S24). Once the appropriate representative color is determined for a group, set all pixels in that group to that representative color (Step S26).

The process of finding, when required, the maximum color for each group (step S22) is shown in FIG. 4. In Step 1 a histogram is generated according to the color codes. This histogram represents all the colors in the input image. Next, in steps 2–8, identify the color shared by a maximum number of pixels of each group $C_k$. The subscript k is used to iterate over all the color groups, and the subscript i is used to iterate over the colors in the k-th color group. Recall that representative code $C_k$ may represent $2^{3n}$ colors, hence the value of i ranges from 1 (step 3) to $2^{3n}$ (step 8). For each value of i in this range, determine whether $P(C_{k,i})$ is greater than $P_{max,k}$ (step 5) That is, determine whether the number of pixels of the i-th color in the representative code $C_k$ is greater the current maximum number of pixels for that group. If it is greater, then look at the next color (step 7) if there is one (step 8). If the number of pixels of the i-th color in the k-th group, $C_k$ exceeds the current maximum, $P_{max,k}$, then reset the current maximum and set the representative color for the group, $C_{rep,k}$ to the color with the maximum number of pixels of that color, that is, $C_{rep,k}=C_{k,i}$ (step 6).

Figure 5:
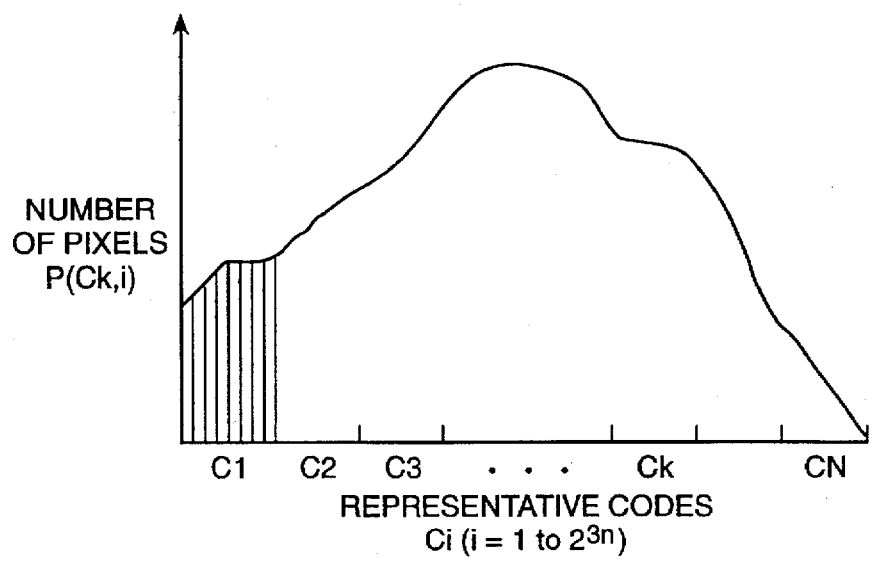
FIG. 5 shows colors classified in a histogram.
Figure 6:
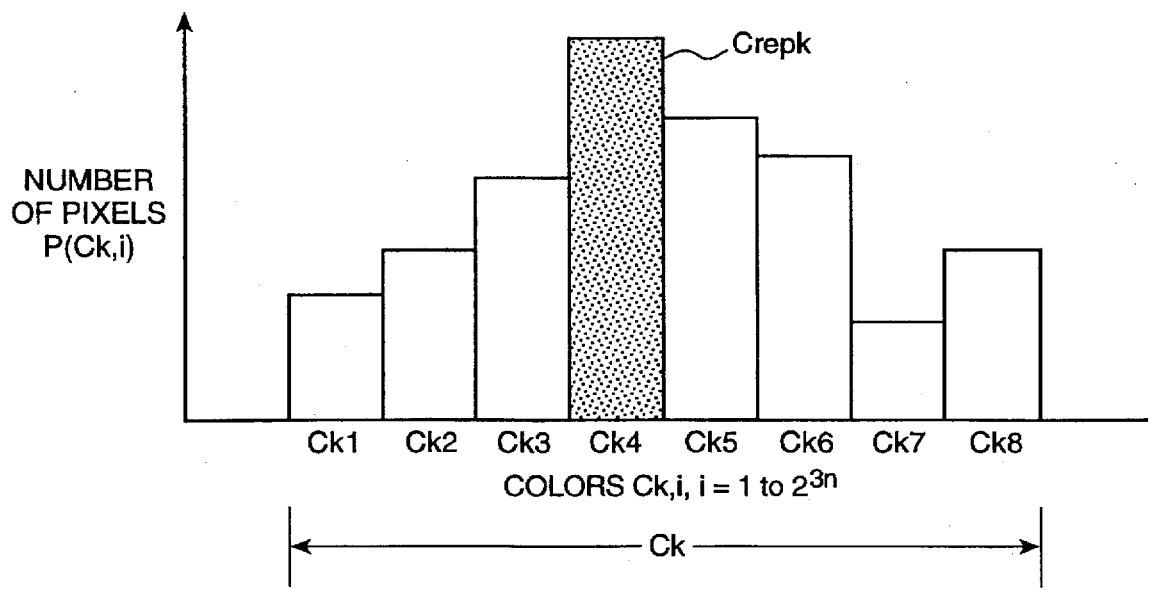
FIG. 6 shows the selection of a representative code for each color group.

Thus, steps 3 to 8 identify the color shared by a maximum number of pixels of each group $C_k$. Once the representative color $C_{rep,k}$ for a group $C_k$ is determined, all the colors in the group are converted to this color (steps 9–12). That is, steps 9 to 12 convert the colors in each group into the color shared by the maximum number of pixels (that is, the representative color calculated according to a weighted average) (see FIGS. 5 and 6).

Having processed the k-th group (in steps 3–12), the next group, $C_{k+1}$, if there is one (step 14), is processed in a like fashion.

A good result is obtained by a simple model in which the number of colors in each group is eight when n=1. In this case, the maximum error is three of four among two colors of a group and the color distance error is two.

According to this invention as described above, data of an original image can be condensed while retaining good similarities to the original image and is very effective to the preserve the original image. Also, data condensation removes noise of the original image when matching a color picture, abstracts only appropriate data for matching, and a more precise recognition is possible. The main elements are preserved and other elements are converted into a neighboring color, and original color elements can be reserved.

While the present invention has been described in connection with what is presently considered to be the most practical and preferred embodiment, it is to be understood that the invention is not to be limited to the disclosed embodiment, but, on the contrary, is intended to cover various modifications and equivalent arrangements included within the spirit and scope of the appended claims.

What is claimed:

1. A method for processing signals representative of color image data representative of a physical image comprising a plurality of pixels, said method comprising the steps of, by computer:

generating electrical signals corresponding to color image data representative of said physical image, said electrical signals representing, for each of said pixels, values of each of three primary colors for said pixel, each of said values having upper bits and lower bits of predetermined lengths;

defining as color data said upper bits of said signals;

defining representative color codes for said image, said codes consisting of said color data sequentially concatenated;

grouping together said electrical signals representative of said pixels in said plurality of pixels having identical representative color codes to form at least one color group;

determining a representative code having a red component, a green component and a blue component for each said at least one group as follows:

$$R_{rep,k} = \frac{\sum_{R_{k,i}} R_{k,i} \sum_{G_{k,i}} \sum_{B_{k,i}} P(C_{k,i})}{\sum_{G_{k,i}} \sum_{B_{k,i}} P(C_{k,i})}$$

$$G_{rep,k} = \frac{\sum_{G_{k,i}} G_{k,i} \sum_{B_{k,i}} \sum_{R_{k,i}} P(C_{k,i})}{\sum_{B_{k,i}} \sum_{R_{k,i}} P(C_{k,i})}$$

$$B_{rep,k} = \frac{\sum_{B_{k,i}} B_{k,i} \sum_{R_{k,i}} \sum_{G_{k,i}} P(C_{k,i})}{\sum_{R_{k,i}} \sum_{G_{k,i}} P(C_{k,i})}$$

where $R_{rep,k}$ is the red component of said representative color of the k-th group, $G_{rep,k}$ is the green component of said representative color of the k-th group, $B_{rep,k}$ is the blue component of said representative color of the k-th group, $R_{k,i}$ is a red component of the i-th color in the k-th group, $G_{k,i}$ is a green component of the i-th color in the k-th group, $B_{k,i}$ is a blue component of the i-th color in the k-th group, and $P(C_{k,i})$ is the number of pixels included in the i-th color of the k-th color group, and where the representative code for the k-th color group is formed by concatenating the red, green and blue components of the k-th color group.

2. The method of claim 1, further comprising the steps of:

determining whether a color corresponding to the k-th representative code is present in said k-th group;

when said color determined not to be present in said k-th group, finding a color of maximal number of pixels in said k-th group; and substituting for said representative color code a color code of said color of said maximal number of pixels.

3. The method of claim 1, wherein the value of each primary color for each of said pixel values is represented by an eight-bit binary number, or which seven bits comprise said upper bits and one bit comprises said lower bits.

* * * * *